United States Patent [19]

Danner et al.

[11] 4,255,618
[45] Mar. 10, 1981

[54] DIGITAL INTERCEPT RECORDER/ANNOUNCER SYSTEM

[75] Inventors: Dean W. Danner; Gary J. Kiel, both of Waukesha, Wis.

[73] Assignee: GTE Automatic Electric Laboratories, Incorporated, Northlake, Ill.

[21] Appl. No.: 30,987

[22] Filed: Apr. 18, 1979

[51] Int. Cl.³ .................... G10L 1/00; H04M 1/64
[52] U.S. Cl. ................... 179/1 B; 179/1 SM; 179/6.17
[58] Field of Search .............. 179/6 C, 1 B, 1 SM; 364/200, 900; 370/58

[56] References Cited

U.S. PATENT DOCUMENTS

| | | | |
|---|---|---|---|
| 3,104,284 | 9/1963 | French et al. | 179/1 SM |
| 3,588,353 | 6/1971 | Martin | 179/1 SM |
| 3,809,810 | 5/1974 | Walker et al. | 179/6 C |
| 3,928,722 | 12/1975 | Nakata et al. | 179/1 SM |
| 4,016,540 | 4/1977 | Hyatt | 179/1 SM |
| 4,049,915 | 9/1977 | Danner | 179/6 C |
| 4,071,888 | 1/1978 | Owens | 179/1 SM |
| 4,121,051 | 10/1978 | Place | 179/1 SM |
| 4,144,582 | 3/1979 | Hyatt | 364/900 |
| 4,181,813 | 1/1980 | Marley | 179/1 SM |

OTHER PUBLICATIONS

Nakata et al., "A Method of Speech Synthesis etc.," Elec. Comm. Japan, pp. 126–134, 1969.
D. Canon et al., "Designing with Microprocessors," Texas Instruments, pp. ii and 2, 1975.

*Primary Examiner*—Charles E. Atkinson
*Assistant Examiner*—E. S. Kemeny
*Attorney, Agent, or Firm*—Robert J. Black; Frank J. Bogacz

[57] ABSTRACT

A digital intercept recorder/announcer system for use in conjunction with a telephone central office. The system performs the function of recorded message announcement for messages such as wrong number, time or weather announcements. The system samples and digitizes audio input signals from local or remote audio sources. Sampled data is stored in sequential fashion in memory so that it may be read out of memory exactly as it was stored. Upon demand, these stored signals are retrieved from memory, reconverted to an analog form and coupled to a subscriber's line for audio transmission to the subscriber. Delta modulation techniques are employed in the system.

12 Claims, 7 Drawing Figures

DIGITAL INTERCEPT RECORDER / ANNOUNCER

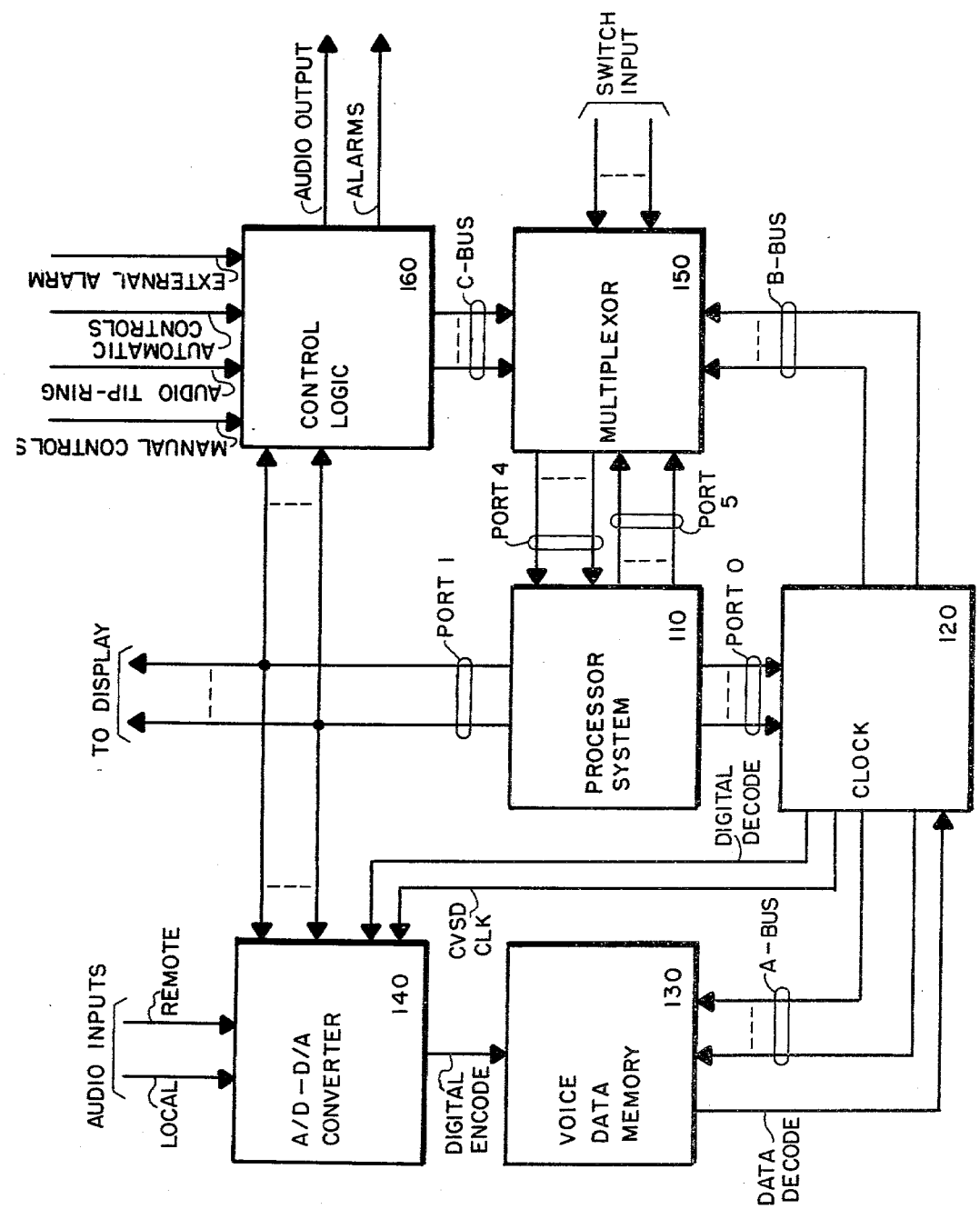
FIG. 1 DIGITAL INTERCEPT RECORDER / ANNOUNCER

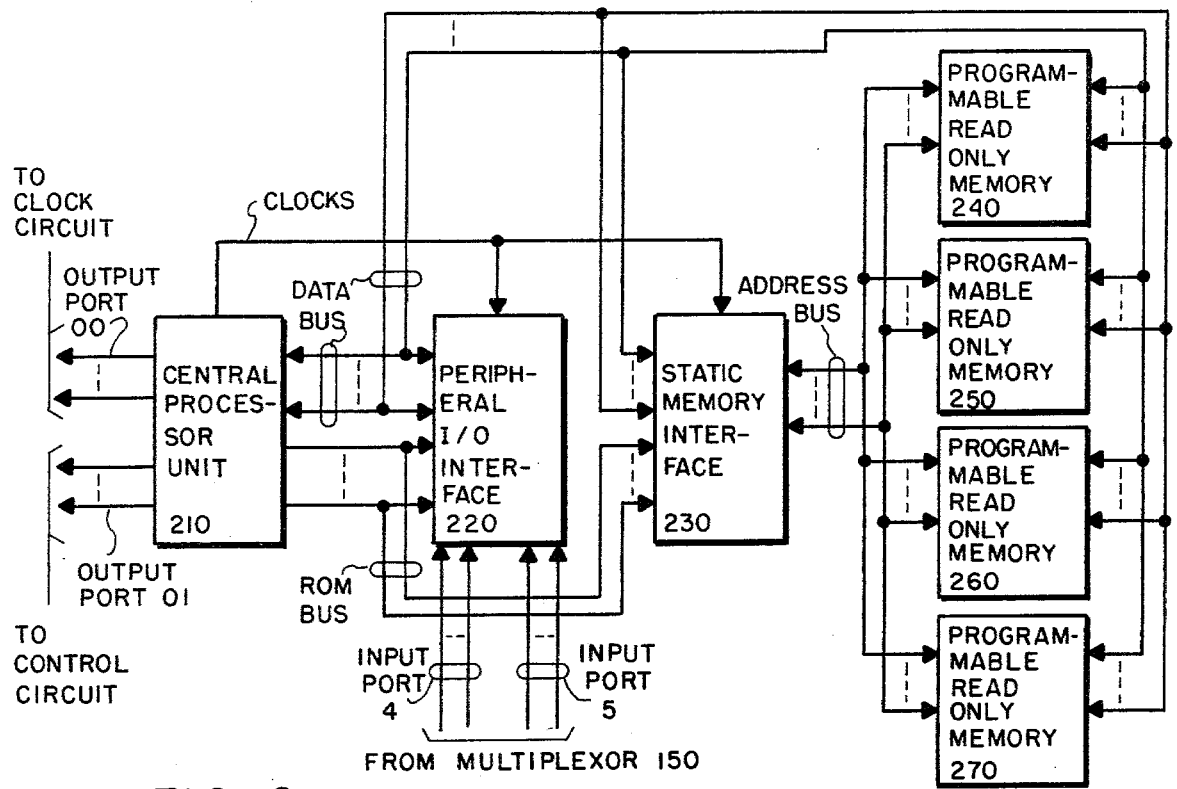
FIG. 2 PROCESSOR SYSTEM -110
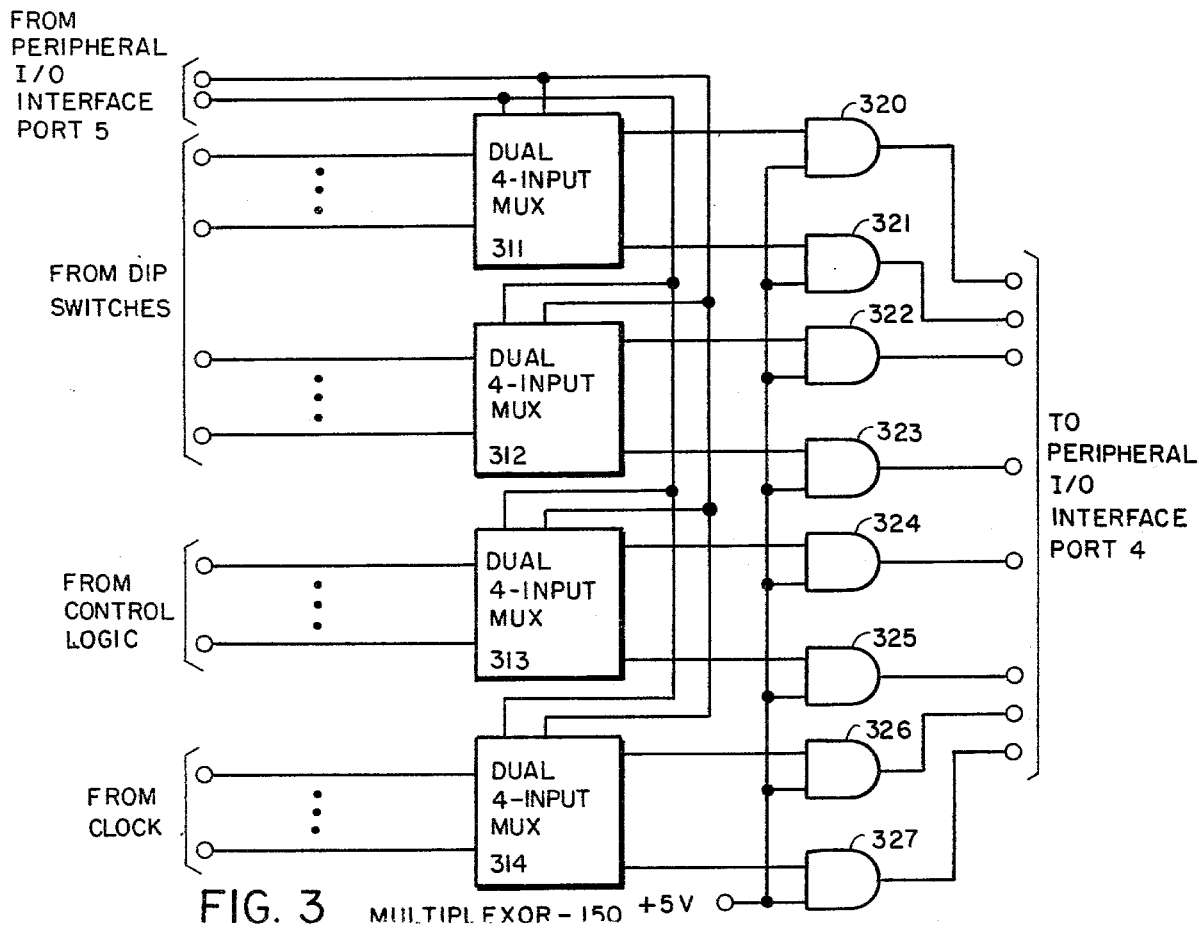
FIG. 3 MULTIPLEXOR -150

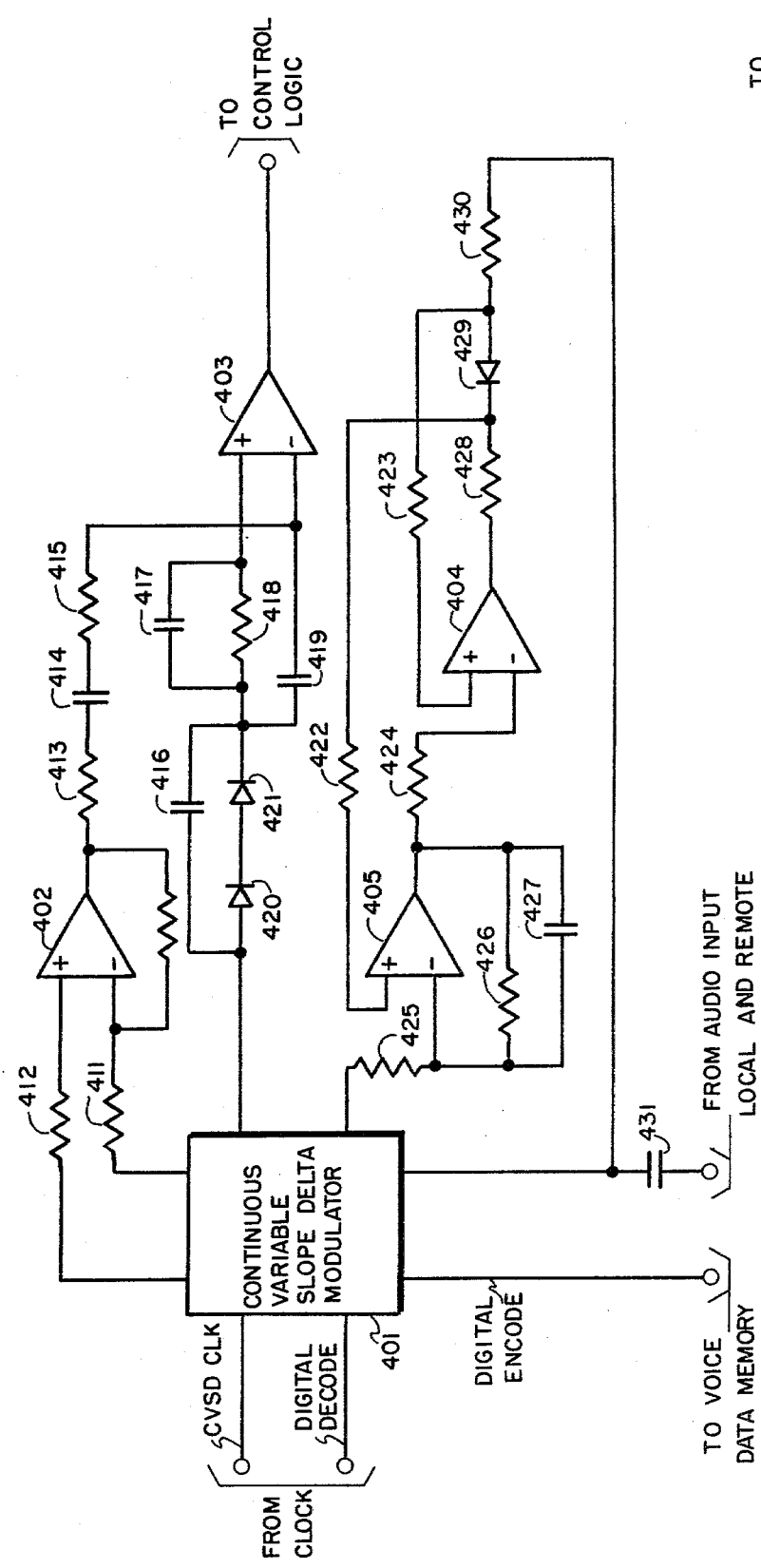
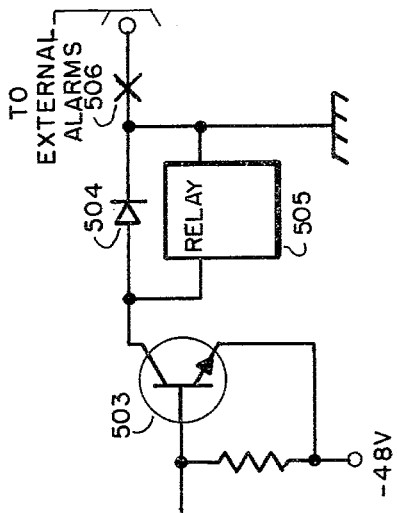
FIG. 4 CONVERTER - 140
FIG. 5 TYPICAL DRIVER CIRCUIT

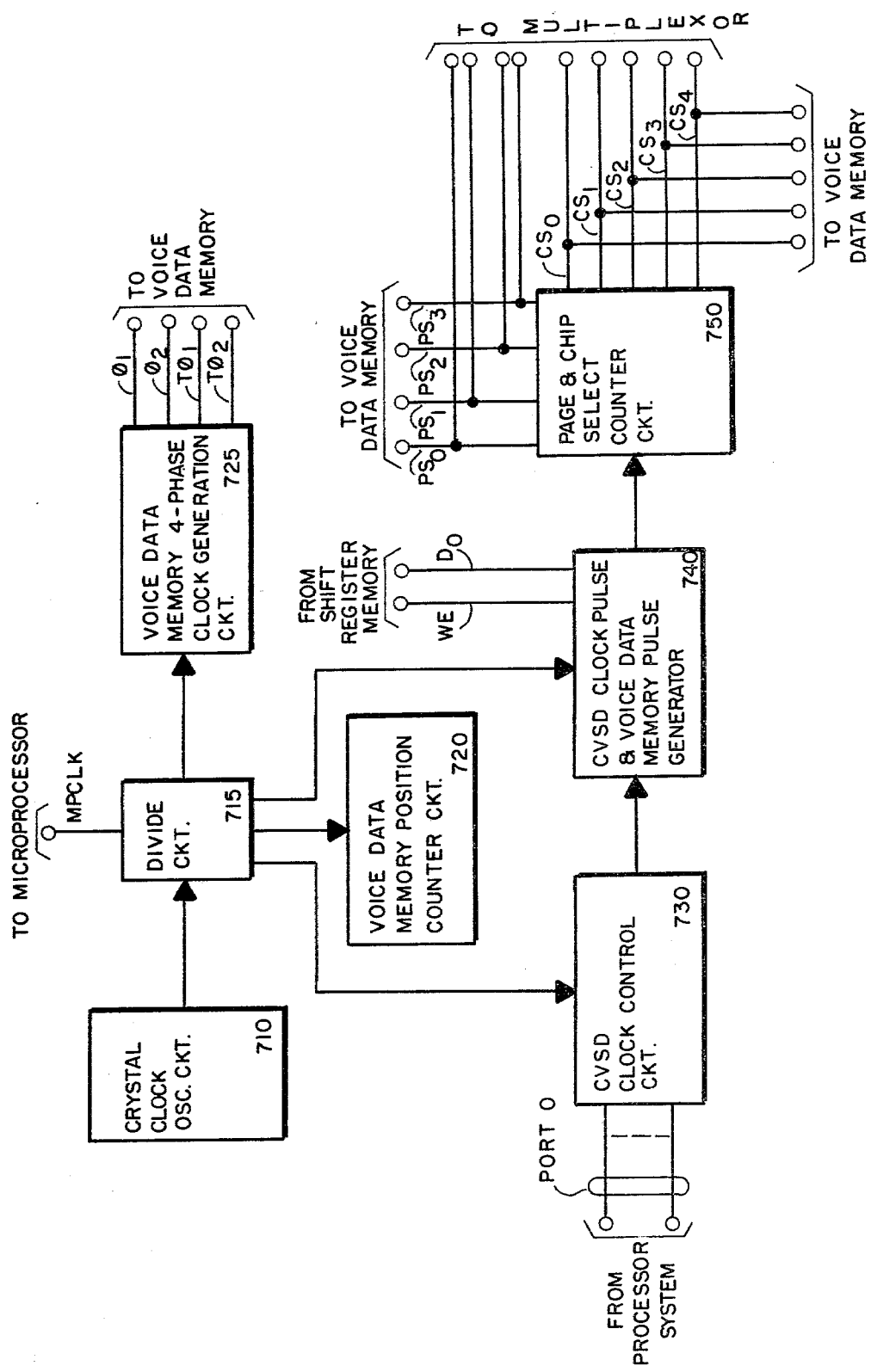
FIG. 7 CLOCK-120

DIGITAL INTERCEPT RECORDER/ANNOUNCER SYSTEM

BACKGROUND OF THE INVENTION (1) Field of the Invention

The present invention relates to recorded announcement systems for use in conjunction with a telephone central office and more particularly to a programmable solid-state recorder/announcer system providing for such services as wrong number time or weather announcement, etc.

(2) Description of the Prior Art

One of the many functions that a telephone central office must provide is that of recorded announcements such as: time announcement, weather announcement, wrong number announcement, disconnected number announcement and other miscellaneous announcements. Typically, such announcement messages are provided by some form of tape recorder medium. Historically tape recorders were considered a vast improvement over operators who had to deliver this type of information to telephone subscriber's.

GTE Automatic Electric is a manufacturer of recorded announcement intercept units. Two of these devices are the INT-2, a tape loop type intercept and the MCF unit which is a drum tape intercept. Subsequently manufactured is an INT-3 intercept unit which is similar to the INT-2 in that it is a tape loop type intercept. Such tape loop type intercept devices have the disadvantage in that the type loop has a definite service usage life. That is, these tapes become distorted and useless after a specific usage period.

The tapes used on tape loop type intercept units such as, the INT-3 and the INT-2, may have a useful life of up to a million cycles of announcement messages. Typically, these tapes should be replaced After a quarter of a million cycles. In large telephone central offices, it is not uncommon for a particular tape loop type intercept unit to require four or more tape loops per year. Although such tape loops are relatively inexpensive, it is costly for maintenance personnel in the telephone central office to be required to replace these tape loops several times each year.

Drum intercept units, such as the MCF, exhibit the problem that the drum must be lubricated periodically in order for its associated tapes to remain usable. Again, such required scheduled maintenance is costly to the operation of large telephone central offices. Additional problems exhibited by both the tape loop and drum type intercept units are wear of the recording and playback heads, motors, bearings, idlers, etc. It is a simple law of mechanics, that when two surfaces move in contact with one another as in the case of a tape head against a tape or the shaft motor against a bearing surface or an idler against a bearing surface that both of the surfaces will be slowly but inevitably worn. The manpower required for scheduled maintenance is the chief problem exhibited by the above mentioned intercept units.

A partial solution to the above mentioned problems is exhibited by U.S. Pat. No. 4,016,540 issued on Apr. 5, 1977 to G. P. Hyatt, which teaches an apparatus and a method for providing interactive audio communication. This patent describes a relatively large size computer system that employs synthesized speech signals to interact with an operator whereby the synthesized speech signals are transmitted to the operator. Digital information representing a message is pre-stored in a memory. Such message information is accessed in response to operator generated signals to provide audio messages to the operator. This system provides speech replies to the operator, but provides no arrangement for the recording of the operators speech and subsequent storage thereof. This system provides for the audio output of pre-recorded messages stored in a read only memory.

A voice signal processing system for recognizing an input voice message and generating an output voice message is shown by U.S. Pat. No. 4,144,582, issued on Mar. 13, 1979, to G. P. Hyatt. Such system teaches no storage and reproduction of the exact voice message input to the system. Only voice recognition and output of a pre-stored message is shown.

Therefore, it is the object of the present invention to provide a digital recorder/announcer system, for use by a telephone central office, which is small in size, with no moving parts requiring maintenance, providing for the recording of audio speech signals and the playback of these audio signals in the same voice in which they were recorded.

It is a feature of the present recorder/announcer system to minimize the amount of voice storage memory due to the particular sampling scheme employed.

It is also a feature of the present invention to employ a stored program data processor controller to provide flexibility of the recorder/announcer system.

SUMMARY OF THE INVENTION

The present invention consists of a digital intercept recorder/announcer system for use in conjunction with a telephone central office. This system records voice signals of a speaker via local microphone input, remote microphone input via telephone lines or by voice signal supplied via a previously recorded message on a tape recorder or similar device. These voice signals are converted to a digital form from their input analog form and stored by the system. Upon demand and under control of the telephone central office these messages are summoned from the system's memory and reconverted to an analog form for transmission to a particular telephone subscriber's line. Therefore, the subscriber receives the particular announcement which was recorded in the system's memory, such as time, weather, or wrong number announcement.

The present invention generally consists of a microprocessor data processing unit, controlling logic and associated interface relays, an analog to digital—digital to analog converter and a voice data memory. The microprocessor provides the basic control function for the system, and is connected to a clock circuit which provides the necessary timing signals to operate the microprocessor. The system's microprocessor is further connected to the an analog to digital—digital to analog converter via an output port bus which also connects the microprocessor to the control logic. This same bus also connects the converter with the control logic for the transmission of analog audio input and output signals.

Although a specific embodiment of the present invention shows the data processor consisting of a microprocessor and associated clock configured locally, the data processor may be located remotely or may be located in the telephone central office switching equipment.

The analog to digital—digital to analog converter is connected to a voice data memory. The voice data memory is a read/write memory including a plurality of sequentially accessed charge coupled device memory units. The analog to digital—digital to analog converter employs delta modulation techniques and more specifically variably slope delta modulation techniques with a sample rate between 14 and 66 kilohertz. For a nominal sample rate of 32 to 38 kilohertz, only 38,000 bits of information are recorded for every second of speech input, as contrasted with a total of over 64,000 bits of information per second required by a PCM system with a nominal sample rate of approximately 8 kilohertz. This represents a savings in memory of approximately 50% for the digital representation of a given message by delta modulation techniques.

The clock circuit is also connected to both the analog to digital—digital to analog converter and to the voice data memory. The clock circuit controls the storage of data in the voice data memory by providing sequential addressing of the memory at the proper time intervals. In addition, the clock circuit provides for reading out the contents of the voice data memory in a programmable sequential fashion for transmission to the converter under proper timing controls for subsequent transmission to a subscriber's line.

The microprocessor has input and output bus connections to a multiplexor unit. The multiplexor unit is further connected to the clock circuit providing for the transmission of timing signals from the clock circuit to the microprocessor. The multiplexor is further connected to microswitches, located on the digital intercept recorder/announcer circuit card, which provides as manual selection of the particular sampling rate to be used by the system. The sampling rate represented by the settings of the switches is input through the multiplexor to the microprocessor so that under program control the proper frequency may be selected. The multiplexor is connected to a control logic unit which provides for electromechanical to electronic conversion of control signals. These control signals are transmitted from the control logic through the multiplexor to the microprocessor. The microprocessor then operates the system in response to the particular control function selected.

When it is desired to record an announcement message on the digital intercept recorder/announcer system, the record function is selected by the controls and input from the control logic via the multiplexor to the microprocessor. In response to that selection, the microporcessor controls the reception of analog information by the analog to digital—digital to analog converter which samples the speech signals input at a predetermined rate. The digital information produced by the converter is stored one bit at a time in the voice data memory in a sequential fashion so that the speech signals input may be read out of memory in exactly the same fashion in which they were input. Control of the sampling by the converter and storage of the data in the voice data memory is affected by the clock circuit. At the termination of the speech signals representing the input message, the appropriate position in memory is marked so that empty memory is not played back to a subscriber's line thereby subjecting the subscriber to some number of seconds of no sound at all.

When the telephone central office selects the message contained in the digital intercept recorder/announcer by connecting the subscriber tip and ring leads to the control logic, the microprocessor detects the request for the playback of the recorded announcement. As a result, data is read from the voice data memory one bit at a time at a particular predetermined frequency. This data is gated through the clock circuit to the analog to digital—digital to analog converter where the reconstruction of the analog signals represented by the digital signals occurs. These reconstructed analog signals are subsequently coupled to the control logic for transmission to the subscriber line. This sequence of one bit at a time transmissions from the voice data memory through the clock circuit, converter, and control logic to the subscriber line takes place until all the digital information stored in the voice data memory representing the message has been output to the subscriber. As a result the subscriber hears the complete recorded announcement in the particular voice when was used to record it.

DESCRIPTION OF THE DRAWINGS

FIG. 1 is a block diagram of a digital intercept recorder/announcer system embodying the principles of operation of the present invention.

FIG. 2 is a block diagram representing the processor system of FIG. 1.

FIG. 3 is a schematic diagram representing the multiplexor of FIG. 1.

FIG. 4 is a schematic diagram representing the interconnections of the analog to digital—digital to analog converter as shown in FIG. 1.

FIG. 5 is a schematic diagram representing a typical driver circuit employed by the control logic shown in FIG. 1.

FIG. 7 is a block diagram depicting the circuitry employed by the clock as shown in FIG. 1.

DESCRIPTION OF THE PREFERRED EMBODIMENT

Figure 6:
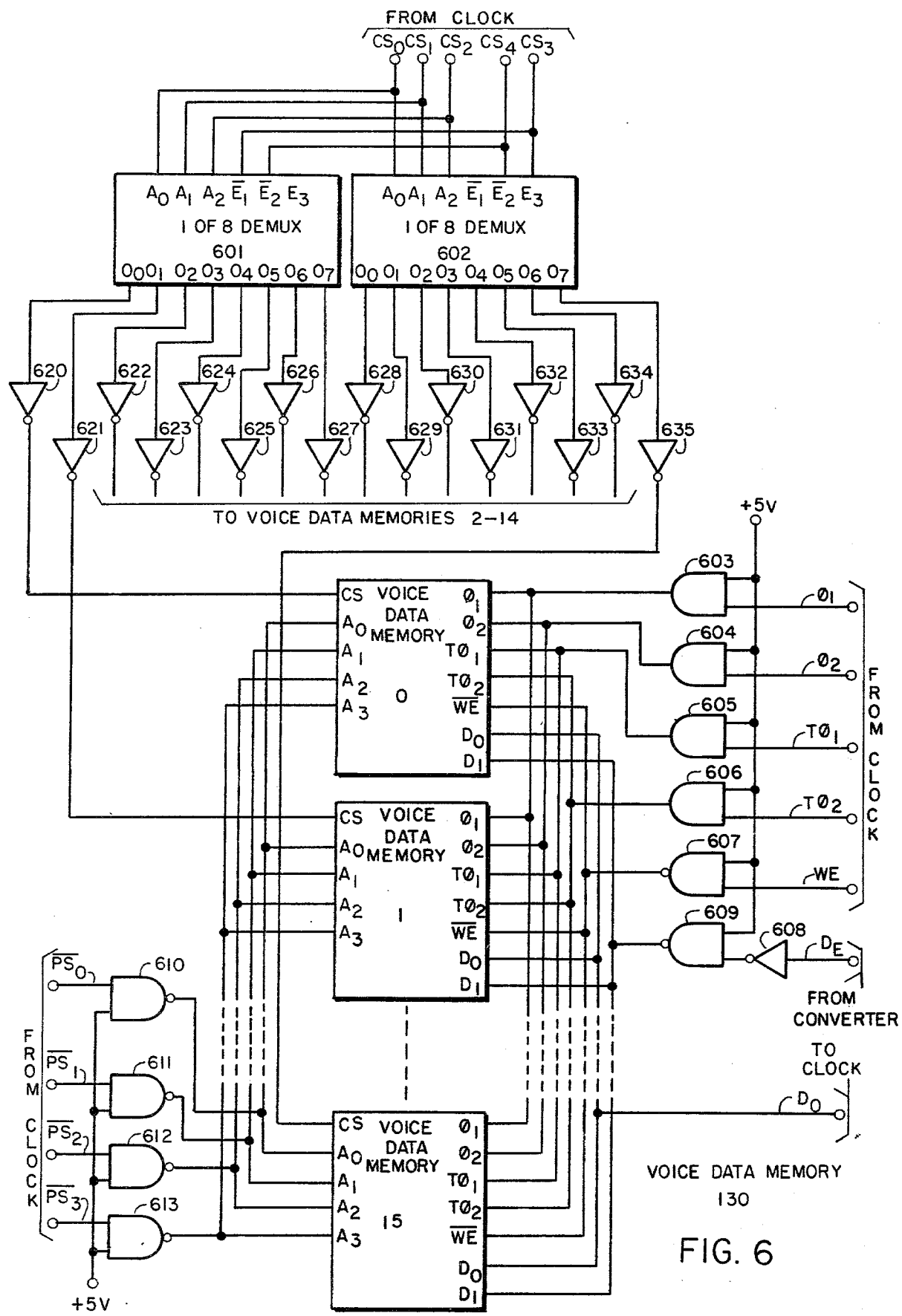
FIG. 6 is a schematic diagram of a voice data memory shown in FIG. 1.

Referring to FIG. 1, a block diagram of a digital intercept recorder/announcer embodying of principles of operation of the present invention is shown. The processor system 110 is shown having an output bus PORT 1 connected between the processor system 110, A/D-D/A converter 140, control logic 160 and a read-out display (not shown). The processor system 110 is connected to clock 120 via output bus PORT 0. Processor system 110 is connected to multiplexor 150 by output bus PORT 5 and also by input bus PORT 4. Both local and remote audio inputs are transmitted to the A/D-D/A converter 140 via input connections. Converter 140 is further connected to voice data memory 130 whereby voice data memory 130 is provided with a stream of digital input signals via the DIGITAL ENCODE lead. Clock 120 is connected to converter 140 and provides converter 140 with both data and timing signals via the DIGITAL DECODE and the CVSD CLK leads respectively. Clock 120 is connected to voice data memory 130 via the A-BUS whereby voice data memory 130 receives timing and counting information for the storage of data. Voice data memory 130 is further connected to clock 120 via the DATA DECODE lead for the transmission of digital information from the memory 130 to the clock. Clock 120 is further connected to multiplexor 150 via the B-BUS whereby timing signals required to operate the processor system 110 are provided. Lastly, the control logic 160 is connected to multiplexor 150 via the C-BUS providing for the coupling of external signals to the processor system 110.

The circuitry comprising the above mentioned components is located on one physical printed wiring card. Multiplexor 150 has input connections from microswitches also located on the printed wiring card. These microswitches are pre-set by an operator and indicate the particular sampling frequency to be employed by the digital intercept recorder/announcer system in the storage and playback of voice signals. Control logic 160 has input connections from manual controls associated with the intercept recorder/announcer system and connection to the audio tip and ring leads, automatic controls and from external alarm sources. In addition, control logic 160 provides the intercept system with output connections to audio output and external alarms.

When it is desired to record an announcement message on the digital intercept recorder/announcer system, that specific function is selected by either the manual or automatic controls and input via control logic 160 through multiplexor 150 to the processor system 110. In response to the above selection, the processor system 110 controls the reception of audio signals from either a remote or local source. These audio input signals are sampled by converter 140 at a particular one of a group of frequencies which is selectable by the microswitch input connected to multiplexor 150. Also, processor system 110 outputs a physical indication of the function selected on the display device. Converter 140 employs variable slope delta modulation techniques, sampling at rates between 14 and 16 kilohertz, generating 38,000 bits of information for every second of audio input signal recorded. This is contrasted with typical PCM systems employing sampling rates of 8 kilohertz and thereby generating in excess of 64,000 bits of information per second of audio signal recorded. Delta modulation is a modulation technique wherein the output data stream is a series of 1's and 0's corresponding to an increase in output voltage and the 0's corresponding to a decrease in output voltage.

As each sampled bit of information is received, it is forwarded from converter 140 to voice data memory 130 via the DIGITAL ENCODE lead. As the sampled bit is received by memory 130, clock 120 via the A-BUS provides timing signals and counting information for the sequential storage of each sampled bit of data. This data is stored in a sequential fashion so that the speech signals received may be read out of memory in exactly the same fashion in which they were written into memory. Clock 120 also provides the proper timing pulses for the sampling of data by converter 140. This clock pulse signal is transmitted from clock 120 to converter 140 via the CVSD CLK lead.

At the termination of the audio input message, the processor system 110 has calculated the position in voice data memory 130 which contains the last data bit representing the message. This position is marked so that empty memory is not played back to a subscriber's line, since this would produce no audible sound for the subscriber. As a result the recording function is complete and the digital intercept recorder/announcer system may now be placed into the playback mode for use by the telephone central office.

When the telephone central office switching equipment selects the digital intercept recorder/announcer system for playing back a pre-recorded message, the subscriber's tip and ring leads are connected to the control logic 160. In response, the processor system 110 detects the request for the playback of the recorded announcement and initates the transmission of data stored in voice data memory 130 via the DATA DECODE lead. The data is transferred one bit at a time from voice data memory 130 to the clock 120 where it is subsequentially gated and transmitted to converter 140 via the DIGITAL DECODE lead. Timing pulses are also transmitted by clock 120 to converter 140 via the CVSD CLK lead. These timing pulses operate converter 140 to re-convert the digital data presented to it into analog output signals suitable for transmission to the subscriber's line. These analog output signals are transmitted via the PORT 1 bus from converter 140 to control logic 160 and from control logic 160 to the telephone office switching equipment via the AUDIO OUTPUT lead. Therefore, the subscriber hears the recorded announcement message in the same voice in which it was recorded by the recorder/announcer system.

FIG. 2 depicts the processor system 110 as shown in FIG. 1. Although a specific embodiment of the present invention shows the data processor consisting of a microprocessor and associated clock configured locally, the data processor may be located remotely or may be located in the telephone central office switching equipment. The processor system includes a central processor unit 210 connected to the clock 120 of FIG. 1. In this embodiment of the invention, the central processor unit 210 may comprise an F8 Microprocessor such as that manufactured by Fairchild Semiconductor, Inc., part number F3850PC. The program instructions for the operation of the central processor unit 210 are contained in the programmable read only memory units 240, 250, 260 and 270. These programmable read only memory units (PROM's) are of the fusible link type and have a capacity of 512 8 bits words. The contents of this memory may be read out only. These PROM's may be implemented employing Fairchild Semiconductor, Inc. devices part number F93448PC. The data bus of memory units is connected directly to the central processor unit 210 data bus. The address bus of central processor unit 210 for program instruction fetching is connected to a static memory interface device 230. This static memory interface device decodes the particular PROM unit to be selected based upon the instruction address. The static memory interface device 230 may be implemented by Fairchild Semiconductor, Inc. device part number F3853PC. Lastly, the central processor unit 210 has its address and data buses connected to a peripheral I/O interface device 220. This device provides additional PORTS 4 and 5 which connect the central processor unit 210 to multiplexor 150 as shown in FIG. 1. The peripheral I/O interface device 220 may be implemented by Fairchild Semiconductor, Inc. device part number F3861EPC.

Central processor unit 210 controls the sampling rate of the converter 140 via output PORT O. A binary coded number representing the particular frequency at which the converter is to be operated is transmitted to the clock 120 which subsequently provides the necessary timing pulses to the converter 140. Output PORT 1 connects converter 140, control logic 160 and the display.

Referring to FIG. 3, the details of multiplexor 150 are shown. Multiplexor 150 may be implemented employing a plurality of dual 4-input multiplexor units 311 through 314 (part number 74LS153). These multiplexor units are connected to gates 320 through 327. Multiplexor units 311 and 312 are connected to dual in line package (DIP) microswitches. These switches are manually fixed by an operator to set the particular sampling frequency for the record and playback operations of the system. Multiplexor unit 313 is connected to the control logic 160 and multiplexor 314 is connected to clock 120. Signals from the above mentioned connected devices are gated by gates 320 through 327 to the peripheral I/O interface device 220 at the appropriate time. Enabling signals controlling the operation of multiplexor units 311 through 314 are transmitted from the peripheral I/O interface device 220 by connections to each of the multiplexor units.

FIG. 4 depicts the interconnections of the elements comprising converter 140. The converter 140 chiefly comprises a continuous variable slope delta modulator integrated circuit such as the kind manufactured by Motorola Semiconductor, Inc. part number of MC3418L. This device is connected to operational amplifiers 402 through 405 also manufactured by Motorola Semiconductor, Inc. part number MC1458. Local or remote audio input is connected to the continuous variable slope delta modulator (CVSD) 401 via capacitor 421. This connection is accomplished via pin 2 of the CVSD integrated circuit 401. Pin 9 of the CVSD 401 is connected to clock 120 via the CVSD CLK lead whereby the clock pulses necessary to ENCODE or DECODE DATA signals are provided. Pin 11 of the CVSD 401 is connected to voice data memory 130 via the DIGITAL ENCODE signal. The digital samples (bits) taken by the CVSD are transmitted to the voice data memory 130 for storage. That is, each bit as it is sampled by the CVSD is transmitted via the DIGITAL ENCODE lead to voice data memory.

Pin 10 of the CVSD 401 is connected to clock 120 whereby digital data recorded in voice data memory 130 is transferred through the clock 120 to the CVSD 401 for conversion to analog form. The analog output signal is provided via the output terminal of operational amplifier 403 to the control logic.

FIG. 5 represents a typical driver circuit contained in the control logic 160. Operational signals are transmitted via a PORT 1 lead to operational amplifier 501 where the signals are amplified and passed to optical coupler 502 which provides isolation of the electronic and electromechanical portions of the circuitry. The isolated output of optical coupler 502 is sent to transistor 503 where it is further amplified and operates relay 505 to close contact 506, thereby operating for example, an external alarm. The above circuitry constitutes an output driver circuit. An input driver circuit is constructed in a similar manner to that of the output driver circuit described above except that the flow from the processor system to the relay would be reversed for an input driver circuit.

In FIG. 6 the detailed circuit connections of voice data memory 130 are shown. One-of-eight demultiplexor units 601 and 602 are connected to the clock 120 whereby the clock provides an indication via leads CSO through CS4 of the particular voice data memory unit (0 through 15) to be utilized for the current storage of data or the removal of data. Each of demultiplexor units 601 and 602 provides 8 output signals which are connected to a corresponding voice data memory unit (0 through 15) through inverter gates 620 through 635 respectively. Each of the voice data memory units (0 through 15) consists of a charge coupled device memory unit having 16 shift registers, each shift register has a capacity of 4,096 bits. These memory devices may be implemented utilizing a Fairchild Semiconductor device part number F4641DC. A particular one of the 16 possible shift registers of each voice data memory unit is selected by signals provided on leads PS (0 through 3) provided by the clock 120. These signals are bussed to each of the 16 voice data memory units. Timing signals 01, 02, T01 and T02 are provided to each of the voice data memory units by the clock. A signal provided on the write—enable (WE) lead determines whether data is written into or read from the memory units. Data written into memory is provided by the DE lead and data read from memory is provided by the DO lead.

For recording or playback operation the write or read mode of memory access is respectively selected. Clock circuit 120 selects via leads CS0 through CS4, the voice data memory 0, initially. The first of the 16 shift registers is selected by an appropriate coding of the signals on leads PS0 through PS3. Data to be written or data to be read from memory is then gated to the DE or DO leads respectively. This process of filling up shift registers is repeated until the entire 16 shift registers of voice data memory have been written or read and then voice data memory 1 is selected, etc. At the location of the end of stored data or where there is no more data to be stored the process of reading or writing the data to memory is halted because the complete message has been recorded or played back.

FIG. 7 is a block diagram of the circuitry employed by clock 120. Crystal clock oscillator circuit 710 is connected to divide circuit 715. The crystal clock oscillator circuit consists of a crystal oscillator integrated circuit with several discrete components necessary for feedback and provides an output frequency of 18 MHZ. Divide circuit 715 consists of a count down chain of 5 flip-flops producing a divide by 10 function. Divide circuit 715 is connected to generation circuit 725 where the 4-phase clock signals for voice data memory are produced. These 4-phase clock signals are: 01, 02, T01 and T02, which are transmitted to the voice data memory 130. Outputs of divide circuit 715 are also connected to CVSD clock control circuit 730, voice data memory position counter circuit 720 and CVSD clock pulse and voice data memory pulse generator 740. The CVSD clock control circuit 730 consists of two 4-bit binary counters with appropriate gating circuitry. The 4-bit binary counters may be implemented utilizing integrated circuits, part number 74LS163PS.

CVSD clock pulse and voice data memory pulse generators 740 consists of a 12 bit binary counter, Fairchild part number F4040PC; a shift register, Fairchild part number 74LS164PC; flip-flops and associated gating circuitry. The signals produced by pulse generator 740 are transmitted to page end chip selected counter circuit 750 where the page selects (PS0 through PS3) and chips selects (CS0 through CS4) are derived. The counter circuit 750 basically consists of a 12 bit binary counter of the type previously described and suitable inverting gates. The page and chip signals derived are transmitted to both the voice data memory unit 130 and to the multiplexor 150. The details of circuits 720, 725, 730, 740 and 750 are not believed to be novel of and in themselves.

Although a preferred embodiment of the invention has been illustrated, and that form described in detail, it will be readily apparent to those skilled in the art that various modifications may be made therein without the departing from the spirit of the invention or from the scope of the append claims.

What is claimed is:

1. A digital recorder/announcer system for use in conjunction with a telephone central office, said central office providing an audio input to said recorder/announcer system and said system providing an audio output suitable for connection to a telephone subscriber's line, said digital recorder/announcer system comprising:
   a clock providing for periodic pulses;
   a microprocessor CPU connected to said clock;
   a program memory connected to said microprocessor CPU;
   a memory interface unit connected between said CPU and said program memory;
   multiplexor means connected to said CPU, said multiplexor means operated in response to said periodic pulses to transmit said pulses to said CPU;
   converter means including a continuously variable slope delta modulator connected to said audio input and including circuit connections to said clock, said converter means operated in response to said audio signals received at said audio and in response to said CPU vai said clock to generate digital output signals;
   read/write memory means connected to said converter means and including circuit connections to and from said clock, said read/write memory means for storing said digital output signals, operated in response to each of said digital output signals and operated in response to said CPU via said clock to store a binary representation of said digital output signal;
   said clock operated in response to said CPU to selectively control the storage of said binary representations in said read/write memory one at a time and said clock alternatively operated in response to said CPU to selectively and sequentially control the retrievel of said binary representations for transmission to said converter means one at a time, so that said stored binary representations are read out from said read/write memory in the same order that said signals were stored in said read/write memory;
   said read/write memory means alternatively operated in response to said clock and to said stored binary representation, to read out and to transmit said binary representations to said converter means; and
   said converter means alternatively operated in response to said clock and to said binary representations read out of said read/write memory means to convert said binary representations to analog signals and couple said analog signals to said subscriber's line via said audio output.

2. A digital recorder/announcer system as claimed in claim 1, wherein: said clock connected to said converter means, operates said converter means at a particular one of a plurality of operating frequencies.

3. A digital recorder/announcer system as claimed in claim 1, wherein: said read/write memory means is operated in response to said clock to transmit each of said stored digital output signals one-at-a time to said clock for subsequent gating to said converter means for conversion and re-transmission to said telephone subscriber's line.

4. A digital recorder/announcer system as claimed in claim 1, wherein: said read/write memory means includes a plurality of memory units accessed in a sequential fashion from the first to last; each of said memory units consisting of a plurality of serial-parallel-serial shift registers addressed sequentially.

5. A digital recorder/announcer system as claimed in claim 1, wherein: said system further includes a plurality of signal inputs from external sources connected to said multiplexor means.

6. A digital recorder/announcer system as claimed in claim 1, wherein said multiplexor means includes: at least one input multiplexor unit arranged to produce a parallel data bus configuration; and gating means connected to said input multiplexor unit providing an interface connection to said CPU.

7. A digital recorder/announcer system as claimed in claim 1, wherein there is further included: control logic means connected to said converter means, to said CPU and to said multiplexor means operated to transmit signals from said external sources to said CPU through said multiplexor means or alternatively operated to transmit said analog output signals from said converter means to said telephone subscriber's line via said analog audio output.

8. A digital recorder/announcer system as claimed in claim 1, wherein there is further included: a peripheral I/O interface unit connected between said CPU and said multiplexor means.

9. A digital recorder/announcer system as claimed in claim 1, wherein: said CPU and said clock are included within said digital recorder/announcer system.

10. A digital recorder/announcer system as claimed in claim 1, wherein: said CPU and said clock are located within said telephone central office.

11. A digital recorder/announcer system as claimed in claim 1, wherein: said CPU and said clock are located remote from said recorder/announcer system.

12. A digital recorder/announcer system as claimed in claim 1, wherein said clock includes: a crystal controlled oscillator circuit providing a particular predetermined frequency output signal; divider circuitry for counting down said predetermined frequency output signal to a plurality of secondary frequency signals for transmission to said read/write memory means and to said CPU; and counter means connected to said divider circuitry and to said read/write memory means for controlling the reading and writing of said digital output signals to and from said read/write memory means.

* * * * *

UNITED STATES PATENT AND TRADEMARK OFFICE
CERTIFICATE OF CORRECTION

PATENT NO. : 4,255,618
DATED : March 10, 1981
INVENTOR(S) : Dean W. Danner and Gary J. Kiel It is certified that error appears in the above-identified patent and that said Letters Patent are hereby corrected as shown below:

Column 9, line 21, after "audio" (second occurrence) should be --input--

Column 9, line 22, "vai" should be --via--

Signed and Sealed this

Twenty-sixth Day of May 1981

[SEAL]

Attest:

RENE D. TEGTMEYER

Attesting Officer

Acting Commissioner of Patents and Trademarks